(12) United States Patent
Tsao et al.

(10) Patent No.: US 7,324,725 B2
(45) Date of Patent: Jan. 29, 2008

(54) TUNABLE OPTICAL ADD-DROP MULTIPLEXER BASED ON SOI WAFER AND MANUFACTURING METHOD THEREOF

(75) Inventors: Shyh-Lin Tsao, Sindian (TW); Chang-Hung Tien, Taoyuan (TW); Chun-Wei Tsai, Hualien (TW)

(73) Assignee: National Taiwan Normal University, Taipei (TW)

( * ) Notice: Subject to any disclaimer, the term of this patent is extended or adjusted under 35 U.S.C. 154(b) by 693 days.

(21) Appl. No.: 10/829,611

(22) Filed: Apr. 22, 2004

(65) Prior Publication Data

US 2004/0234267 A1    Nov. 25, 2004

(30) Foreign Application Priority Data

May 20, 2003    (TW)    ................. 92113661 A

(51) Int. Cl.
*G02B 6/34*    (2006.01)
(52) U.S. Cl. .............................. 385/37; 385/15; 385/31
(58) Field of Classification Search .................. 385/15, 385/31, 37
See application file for complete search history.

(56) References Cited

U.S. PATENT DOCUMENTS

| | | |
|---|---|---|
| 5,875,272 A | 2/1999 | Kewitsch et al. |
| 5,953,467 A | 9/1999 | Madsen |
| 6,047,096 A | 4/2000 | Augustsson |
| 6,438,293 B1 | 8/2002 | Eldada et al. |

FOREIGN PATENT DOCUMENTS

JP    63-76391    *    4/1988

OTHER PUBLICATIONS

Rodney C. Tucker and Richard Lauder, "Optical Add-Droop Multiplexer with Low Crosstalk", IEEE Photonics Technology Letters, vol. 13, No. 6, pp. 582-584, Jun. 2001.
David Mechin, Philippe Grosso, and Dominque Bosc, "Add-Drop Multiplexer With UV-Written Bragg Gratings and Directional Coupler in $Sio_2$-Si Intergrated Waveguides", Journal of Lightwave Technology, vol. 19, No. 9, pp. 1282-1286, Sep. 2001.
Shih-Hsiang Hsu, O. King, F.G. Johnson, J.V. Hryniewicz, Y.J. Chen and D.R. Stone, "InGaAs pin detector array intergrated with AlGaAs/GaAs grating demultiplexer by total internal reflector", Electronics Letters vol. 35, No. 15, pp. 1248-1249, Jul. 1999.

* cited by examiner

*Primary Examiner*—Jennifer Doan
(74) *Attorney, Agent, or Firm*—Volpe and Koenig, P.C.

(57) ABSTRACT

A tunable optical add-drop multiplexer (OADM) based on an SOI (silicon-on-insulator) wafer is disclosed. The tunable OADM includes a multimode interference region, at least a grating formed on the multimode interference region, and at least two electrodes formed on two sides of the multimode interference region and having carriers induced thereinto, thereby a variation of an optical waveguide in the grating is controlled through controlling the carriers induced into the electrodes so as to further control different propagation of wavelength signals.

33 Claims, 15 Drawing Sheets

TUNABLE OPTICAL ADD-DROP MULTIPLEXER BASED ON SOI WAFER AND MANUFACTURING METHOD THEREOF

FIELD OF THE INVENTION

This invention relates to an optical add-drop multiplexer (OADM) and a manufacturing method thereof, and more particularly to a wavelength tunable OADM based on an SOI wafer and a method manufacturing of the same.

BACKGROUND OF THE INVENTION

Because of the growth of Internet, the wideband access condition is getting mature now. Accordingly, it is believed that a large amount of wideband requirement at the access terminal will promote the core network to be brought in the DWDM system so as to increase the bandwidth capacity. Therefore, it is a tendency that the metro DWDM system will gradually be developed from a point-to-point framework to an encircled or a network framework. And, OADM is a key apparatus in the DWDM system. The OADM can integrate traditional SDH/SONET signals into a multi-channel WDM/SONET network so as to save the upgrade cost of the network apparatus.

Generally, OADM can be separated into two types: FOADM (Fixed OADM) and ROADM (Reconfigurable OADM). FOADM is the main stream in the market and can provide an upload and download function of the fixed wavelength. However, because it only provides the upload and download function for specific wavelengths, it is insufficient for the flexible demand of the metro core network. Therefore, in the metro core network, the function of FOADM will gradually be replaced by ROADM which can flexibly adjust the wavelength, and then gradually, FOADM will be used more frequently in the metro edge network and the access network. Moreover, FOADM can be further separated into TFF (Thin Film Filter) type, FBG (Fiber Bragg Grating) type and AWG (Array WaveGuide) type while being separated according to the adopting key component thereof. Because of the product characteristics of FOADM described above, FOADM will become cheaper and cheaper, and obviously, the price thereof will therefore become an important factor to change the purchase desire of the clients. On the other hand, ROADM can be separated into a switch-based OADM and a tunable filter-based OADM, and the price thereof is quite expensive.

Because the Bragg grating will be utilized in the present invention, an introduction of the grating is presented here. For FBG-based OADM, basically, the construction thereof is to set plural FBGs between two circulators. And, these FBGs will respectively reflect specific uplink/downlink wavelength signals and be passed by thru wavelength signals. However, in FBG-based OADM, it is still hard to avoid a loss as the signal is passed through the uplink/downlink and the thru route. And, this type of OADM is easily changed by the temperature. Furthermore, because The FBG-based OADM also needs an amplifier for operating, the volume thereof must be bigger than others so that it will be difficult to be integrated with semiconductor wafers for reducing the cost.

On the other hand, because the wavelength value of the fiber grating is decided by the period between grating fringes written on the core, a reflection-wavelength tunable FBG can be obtained through appropriately adjusting that period. But, if that period is adjusted through altering the temperature, it will appear that the tunable range of wavelength is small and the adjusting speed is also slow, and thus this is unpractical for the industries.

Recently, because silicon can be obtained easily and the price thereof is also low, it already becomes the mainly used material in IC manufacturing. The present invention accordingly utilizes an SOI (silicon on insulator) as a wafer substrate. Regarding the SOI wafer, it is not only advantageous of easy obtainment and low price but also advantageous that the SOI structure can be integrated with advantageous characteristics of CMOS electronic devices, for example, high bandwidth and low power loss. Therefore, the present invention utilizes an SOI IC semiconductor manufacturing technique in manufacturing the critical component for fiber communication. And, it is believed that in the future, the SOI IC semiconductor manufacturing technique will be good at effectively reducing component size and promoting technical competitiveness.

Hence, the present invention employs the SOI for being designed into a tunable OADM (Optical Add/Drop Multiplexer) so as to form a wavelength selectable component, and further, the present invention also develops a protective network of an intelligent wavelength division multiplexing optical network for increasing the reliability of the intelligent wavelength division multiplexing optical network. Moreover, through utilizing the characteristics of multimode interference, the power transmission and coupling efficiency of the component can be significantly increased in the present invention so as to improve the output quality and increase the fiber coupling efficiency. Furthermore, in the design of the present invention, because it only needs to alter the parameters of the waveguide for outputting wavelengths at different sections, this can be applied to all wavelengths for all kinds of technical applications. Consequently, the design according to the present invention is advantageous of effectively saving at least half the area of the wafer and having a small and fine size, high procedure parameter variation tolerance, stable output, and low power loss etc. Accordingly, the present invention is an excellent solution for commercializing the future component.

Recently, there have already some documents regarding the integrated optical component which utilizes SOI as a manufacturing wafer.

In IEEE Photonics Technology Letters, vol. 13, No. 6, pp. 582-584, Rodney C. Tucker and Richard Lauder propose three new OADM architectures with low crosstalk and low component count. These OADMs are composed of a single multiport optical circulator and one or more fiber Bragg grating and have been experimentally proved to tolerate a large power difference.

According to Journal of Lightwave Technology, vol. 19, No. 9, pp. 1282-1286, David Mechin, Philippe Grosso, and Dominique Bosc, a photo-writing process of the Bragg grating and the lowering of the waveguide internal stresses are disclosed so as to increase the efficiency of Directional coupler (DC)-DADM and avoid the use of expensive optical circulators.

In Electronics Letters vol. 35, No. 15, pp. 1248-1249, Shih-Hsiang Hsu, O. King, F. G Johnson, J. V. Hryniewicz, Y. J. Chen and D. R. Stone design a wavelength division multiplexer through utilizing an optical detector array and a periodic grating. The optical detector is made of InGaAs, and the periodic waveguide grating has an AlGaAs/GaAs structure. The passband of a filter thereof is designed at 2 nm, and the wavelength thereof is ranged from 1520 to 1550 nm. However, the volume of the structure is big and the procedure thereof is also complicated.

In U.S. Pat. No. 5,875,272 "Wavelength Selective Optical Device" issued on Feb. 23, 1999, Anthony S. Kewitsch, George A. Rakuljic, Santa Monica and San Marino propose an add/drop filter which is composed of a mode coupler and a grating. This filter utilizes a bi-directional control and the length and the period of the grating for filtering a required wavelength, and the required wavelength can be feedback to the network so that the output and the next input will have an identical wavelength. However, a high manufacture quality of the grating which is not easy to be achieved is needed in this patent.

In U.S. Pat. No. 5,953,467 "Switchable Optical Filter" issued on Sep. 14, 1999, Christi Kay Madsen designs an optical filter comprising a Mach-Zehnder interferometer comprising a pair of optical waveguide arms extending between a pair of directional couplers. And, this pair of arms includes an alternating sequence of a phase shifter on at least one arm and a pair of reflective filters on each arm. Therefore, the filter is particularly useful as a gain equalization filter, an ADM filter and in an optical cross connection.

In U.S. Pat. No. 6,047,096 "Optical Device" issued on Apr. 4, 2000, Torsten Angustsson proposes a MMI-based (multimode interference-based) Bragg grating waveguide structure. In this structure, the Bragg grating is added into the multimode interference region for filtering so that the filtered wavelength can be received at other output ports. However, the grating still needs to be fabricated in this structure, and thus obviously, it will be more complicated.

According to Lauay Eldada, Randolph and Robert A. Norwood, U.S. Pat. No. 6,438,293 "Tunable Optical Add/Drop Multiplexer" issued on Aug. 20, 2002, it can be known that the core layer of the optical signal component includes a grating and a material, and through tuning the refractive index of the material, the grating will reflect a preselected wavelength of light. A single optical signal device can therefore be used to select a variety of wavelengths for segregation.

As described above, the four patents all utilize a waveguide component to serve as the coupler, filter and optical add/drop multiplexer for the division multiplexing, and it is thus evident that the optical add/drop multiplexer is an important component in the optical communication system and there is the necessity to develop a simpler and more convenient optical add/drop multiplexer.

Accordingly, the present invention utilizes a voltage variation to alter the dopant concentration, through which the refractive index can be changed, and thereby a specific signal can be dropped from the waveguide so as to control the router path of the specific wavelength signal.

SUMMARY OF THE INVENTION

According to an aspect of the present invention, a tunable optical add-drop multiplexer (OADM) based on an SOI (silicon-on-insulator) wafer includes a multimode interference region, at least a grating formed on the multimode interference region, and at least two electrodes formed on two sides of the multimode interference region and having carriers induced thereinto, thereby a variation of an optical waveguide in the grating is controlled through controlling the carriers induced into the electrodes so as to further control different propagation of wavelength signals.

Preferably, the optical add-drop multiplexer further includes at least an input port formed on one of the two sides of the multimode interference region for receiving multiple wavelength signals, at least a drop port formed on one of the two sides of the multimode interference region for gathering a portion of the wavelength signals, at least an add port formed on the other the side of the multimode interference region for adding at least a signal having a random wavelength, and at least an output port formed on the other the side of the multimode interference region for outputting a non-gathered portion of the wavelength signals and the signal having a random wavelength.

Moreover, the grating is preferably a Bragg grating, and the grating varies a refractive index thereof so that an optical wave passing therethrough has a tunable wavelength due to an involved the index. Furthermore, the grating can be structurally changed through arranging identical grating periods so as to control a wavelength response, or the grating can be structurally changed through arranging different grating periods so as to control a wavelength response. In addition, the grating is changed in wavelength response through altering a height thereof so as to add or drop different the wavelength signals.

Preferably, the multimode interference region has a variable cross section so that a variation of a corresponding gathered wavelength is presented after the carriers are controlled by different voltages. Alternatively, the multimode interference region has a tunable length and a tunable width for adjusting a wavelength response of the interference so as to adjust a position of an initial central wavelength.

Preferably, the electrodes are changed in structure and/or in dimension so that a current of the carriers has a different injecting efficiency into the electrodes so as to control a speed of adding and dropping a wavelength. Moreover, the electrodes are electroplated by different materials so that a current of the carriers has a different injecting efficiency into the electrodes, and thereby a power variation of a corresponding gathered wavelength is controlled by a variation of a refractive index of the grating so as to design different central wavelength responses.

Furthermore, an instantaneous variation of an index of the grating is achieved through instantaneously inputting different voltages for controlling a power variation of a corresponding gathered wavelength so as to achieve an instantaneous exchange of wavelengths. And, a gathering of the wavelength signals is controlled through operating different instantaneous voltages. Moreover, the electrodes are preferably sectionalized and supplied by different voltages for simultaneously gathering different wavelength signals.

Preferably, when a number of both the output and input ports are N, an optical wavelength exchanging switch with N×N ports is obtained through a serial connection thereamong by using a module arrangement, and, through being supplied different voltages and having multi-sectional electrodes, the optical wavelength exchanging switch simultaneously gathers different wavelength signals.

In addition, plural 2×2 the wavelength tunable optical add-drop multiplexers based on the SOI wafer can be combined to make an N×N Benes optical switch. And, 2×2 the wavelength tunable optical add-drop multiplexers based on the SOI wafer also can be combined in a multilayered sub-matrix arrangement so as to make an N×N MDB switch.

In accordance with another aspect of the present invention, a method for manufacturing a wavelength tunable optical add-drop multiplexer based on a semiconductor wafer includes steps of (a) providing a substrate, (b) forming an insulating layer and a conducting layer on the substrate, (c) defining a multimode interference region and plural input/output waveguides on the conducting layer, (d) forming an N type region and a P type region respectively on two sides of the multimode interference region, (e) defining a periodic grating structure on the multimode interference region, and (f) forming two electrodes respectively on the N type region and the P type region.

Preferably, the semiconductor wafer is an SOI (silicon-on-insulator) wafer, the substrate is a silicon substrate, the insulating layer is a silicon dioxide layer, and the conducting layer is a polysilicon propagating layer.

Moreover, the method preferably further includes a step of doping a doping layer between the insulating layer and the conducting layer, and the step (c) can be performed by a reactive ion etching.

Furthermore, the N type region is formed by doping a pentad element into the conducting layer through an ion implantation, and the P type region is formed by doping a trivalent element into the conducting layer through an ion implantation.

Preferably, a refractive index of the grating is variable through a different concentration distribution of the ions doped by the ion implantation so as to control a variation of a corresponding gathered central wavelength of the wavelength tunable optical add-drop multiplexer for achieving a design of different central wavelengths.

In addition, the ions can be controlled by a current supplied thereto for obtaining different refractive indices of the grating so as to control a power variation of a corresponding gathered wavelength of the wavelength tunable optical add-drop multiplexer for achieving a wavelength exchange.

Preferably, the step (e) is performed by an electron beam etching, and the electrodes are formed through electroplating a metal thin film on the N type and the P type regions.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

An object of the present invention is to provide an effective and automatic router switching method for designing a wavelength selectable component.

Another object of the present invention is to investigate a protection network for an intelligent wavelength division multiplexing optical network so as to improve the reliability of the intelligent wavelength division multiplexing optical network.

Another further object of the present invention is to provide an integrated tunable OADM which can drop out a specific wavelength through adjusting a voltage supplied thereto.

An additional object of the present invention is to provide a tunable OADM, wherein the number of the input and output ports thereof can be increased to N so that a light wavelength exchanging switch with N×N ports can be obtained through a serial connection thereamong by using a module arrangement.

A further another object of the present invention is to provide a tunable OADM, wherein the light wavelength exchanging switch may have a multi-sectional electrode so as to simultaneously drop different wavelength signals out by supplying different voltages thereto.

The present invention now will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
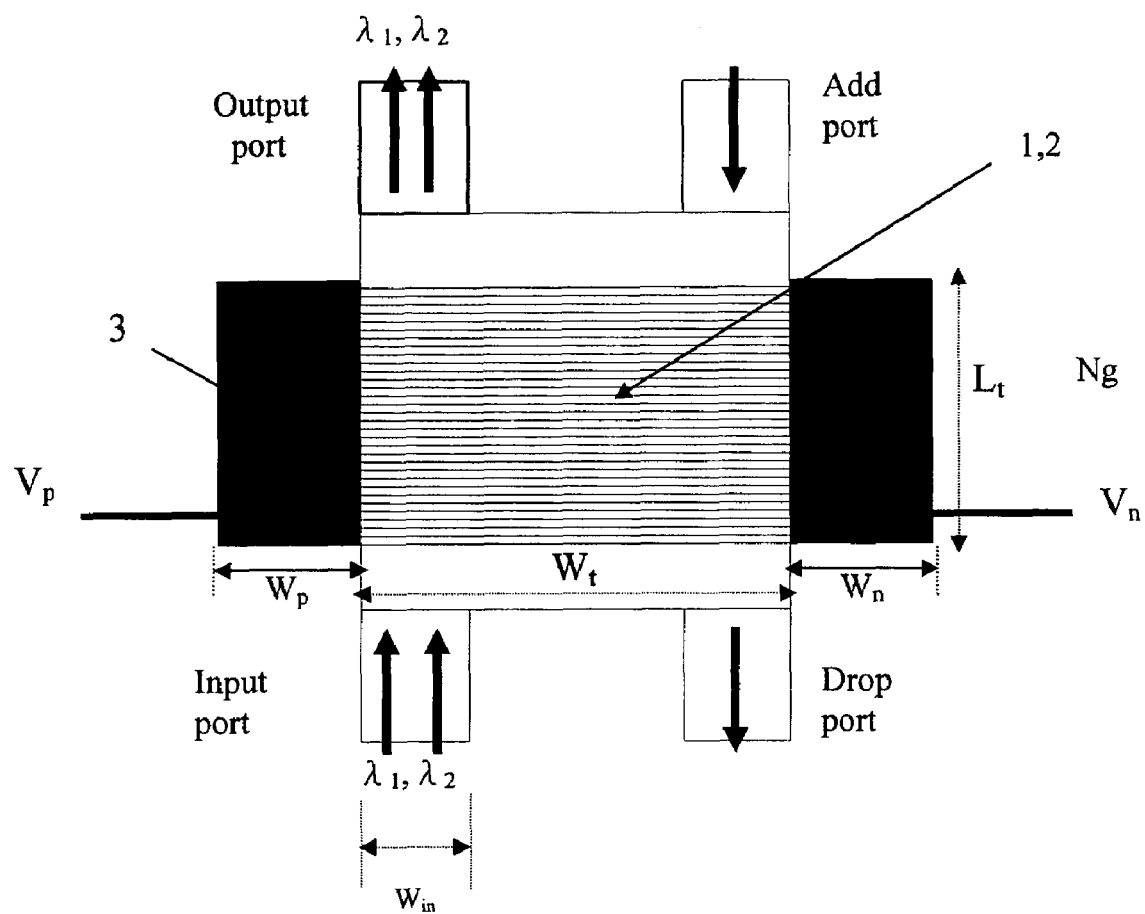
FIG. 1 is a top view of a tunable OADM in a preferred embodiment according to the present invention.

Please refer to FIG. 1 which is a top view of a tunable OADM in a preferred embodiment according to the present invention. The tunable OADM according to the present invention includes a Bragg grating 1, a multimode interference region 2, and two electrodes 3, and the tunable OADM has four ports, an input port, an output port, a drop port and an add port. The basic operation theory of the OADM according to the present invention is that two different wavelength signals $\lambda_1$ and $\lambda_2$ are inputted thereinto through the input port, one of the wavelengths $\lambda_1$ and $\lambda_2$ can be dropped out randomly from the drop port through a voltage control signal, another signal can be added thereon through the add port, and the wavelength signals are outputted from the output port. Furthermore, if the tunable OADM has to process more wavelength signals, this can be achieved by connecting cascade tunable OADMs respectively having different periods.

From FIG. 1, it can be known that the whole length ($N_g$) of the Bragg grating 1 and the length ($L_t$) of the electrodes 3 are both 7800 μm, the widths of the n-type electrode ($W_n$) and the p-type electrode ($W_p$) are identically 600 μm, and the widths of the multimode interference region 2 ($W_t$) and the four ports ($W_{in}$) are respectively 12 μm and 4 μm. Moreover, the operation voltage has two operation modes: ($V_p$=0V, $V_n$=0V) and ($V_p$=0.6V, $V_n$=−0.6V). When the operation voltage is controlled to be ($V_p$=0V, $V_n$=0V), it will drop out the $\lambda_1$ signal at the drop port, and on the contrary, when the operation voltage is controlled to be ($V_p$=0.6V, $V_n$=−0.6V), it will drop out the $\lambda_2$ signal at the drop port.

Figure 2:
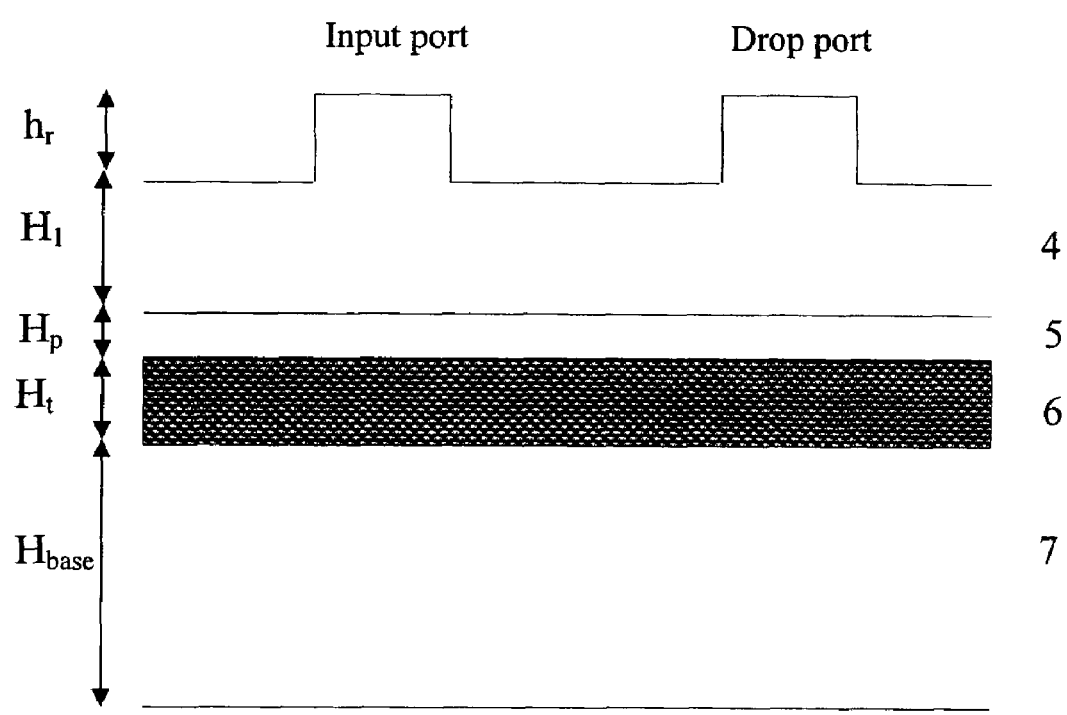
FIG. 2 is a cross section of an input port and a drop port of the tunable OADM in a preferred embodiment according to the present invention.

Please refer to FIG. 2 which is a cross section of the input port and the drop port of the tunable OADM in a preferred embodiment according to the present invention. As shown in FIG. 2, the tunable OADM is comprised of a SOI (Silicon-On-Insulator) structure. The bottom layer is a silicon substrate 7, on which is a silicon dioxide layer 6, and the top layer is a polysilicon propagating layer 4, under which is a doped layer 5. The heights respectively of the silicon substrate 7, the silicon dioxide layer 6, the doped layer 5 and the polysilicon propagating layer 4 are $H_{base}$=2 μm, $H_t$=0.4 μm, $H_p$=0.2 μm, and $H_1$=1.8 μm. The height of rib ($h_r$) above the top layer is 0.8 μm.

Figure 3:
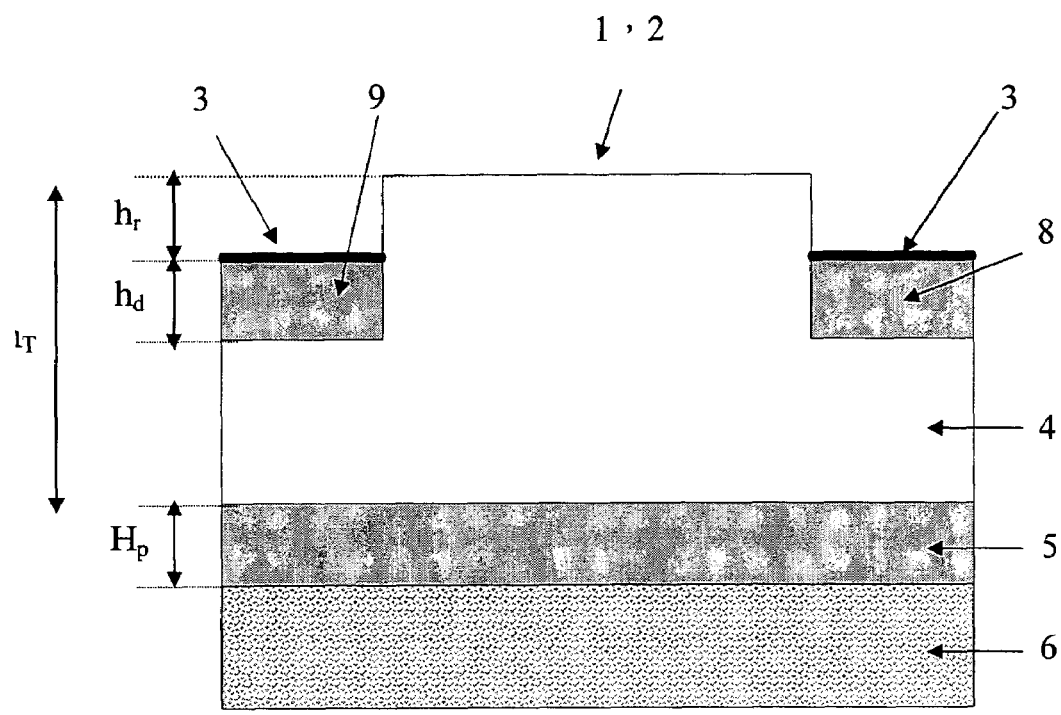
FIG. 3 is a cross section of the tunable OADM and also shows a carrier distribution therein in a preferred embodiment according to the present invention.

Please refer to FIG. 3 which is a cross section of the tunable OADM and also shows a carrier distribution therein in a preferred embodiment according to the present invention. In the tunable OADM, boron and phosphorous ions are doped to form a p-type region 9 and a n-type region 8 respective in a concentration of $10^{18}$ and $2 \times 10^{17}$ 1/cm$^3$ and with an identical depth ($h_d$) of 0.5 μm. Therefore, the two sides of the Bragg grating 1 are doped by boron and phosphorous ions. Then, an aluminum thin film is deposited on the doped regions, and by utilizing a voltage, the boron and phosphorous ions can be moved toward the Bragg grating 1 and the concentration of the dopants in the Bragg grating 1 therefore will be changed. Accordingly, the present invention employs the dopants to alter the refractive index for dropping out a specific signal from the waveguide so as to control the router path of the specific wavelength signal.

Figure 4:
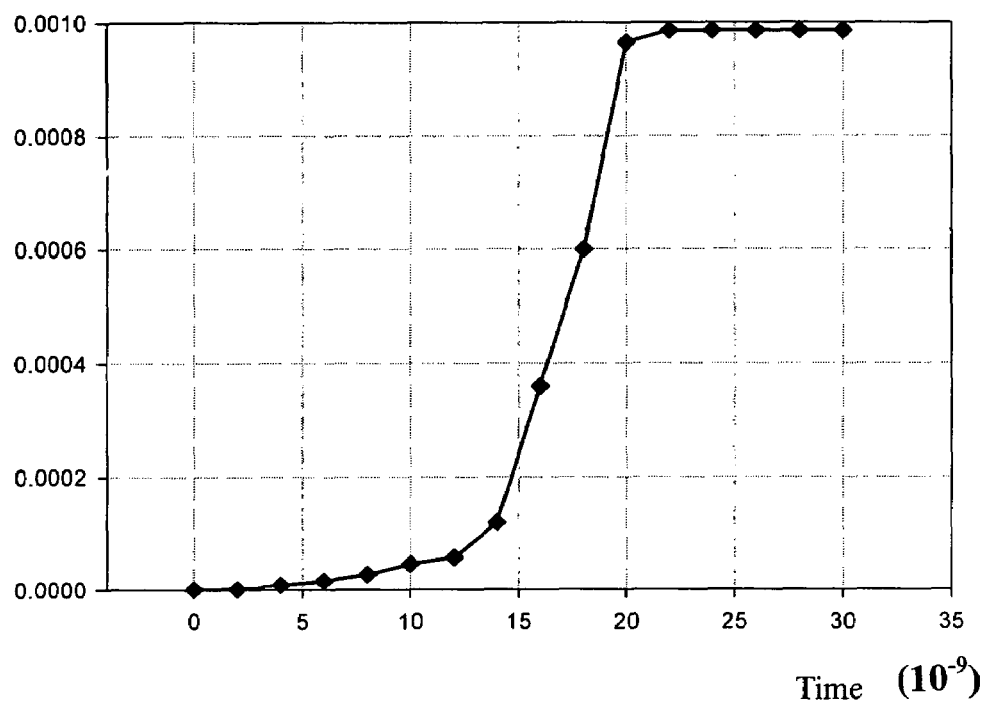
FIG. 4 is a time profile of the refractive index of the tunable OADM in a preferred embodiment according to the present invention.
Figure 5:
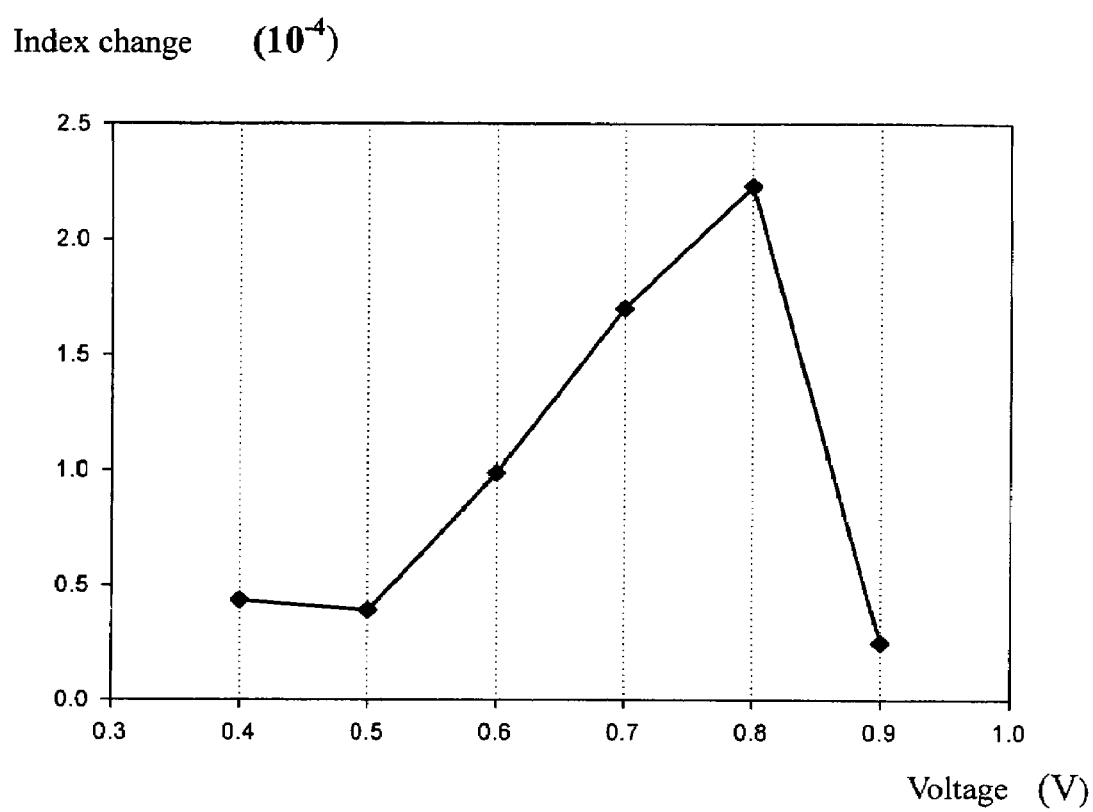
FIG. 5 is a diagram showing a variation of the refractive index of the tunable OADM based on a voltage supplied thereto in a preferred embodiment according to the present invention.

Please refer to FIG. 4 which is a time profile of the refractive index of the tunable OADM in a preferred embodiment according to the present invention. The change of the refractive index can be simulated through a program. As shown in FIG. 4, at time equals to $20 \times 10^{-9}$/sec, the carriers have completely been injected, that is to say the switching speed of the tunable OADM can be controlled within $20 \times 10^{-9}$/sec. Please refer to FIG. 5 which is diagram showing a variation of the refractive index of the tunable OADM based on a voltage supplied thereto in a preferred embodiment according to the present invention. As shown in FIG. 5, when the voltage is getting larger, the refractive index is relatively getting bigger, too. Accordingly, in the tunable OADM according to the present invention, the voltage can be controlled within ±6V. However, the voltage also can be tunable corresponding to a practical situation.

Figure 6:
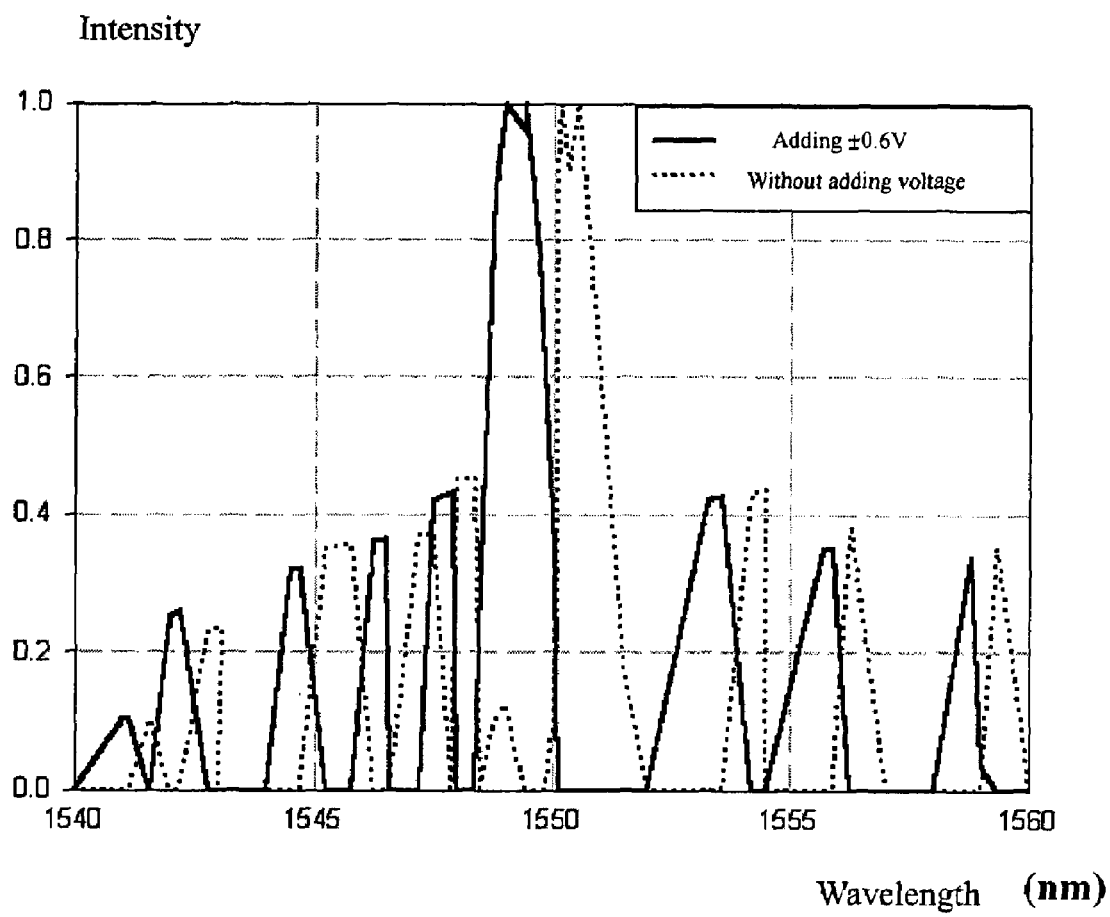
FIG. 6 is a comparative plot showing the intensity of the wavelengths dropped out by the tunable OADM when the voltage is supplied thereto or not in a preferred embodiment according to the present invention.

Please refer to FIG. 6 which is a comparative plot showing the intensity of the wavelengths dropped out by the tunable OADM when the voltage is supplied thereto or not in a preferred embodiment according to the present invention. Because the Bragg grating 1 and the multimode interference region 2 will generate some differences when the voltage is supplied thereto or not, different wavelengths can be dropped out from the drop port.

Figure 7:
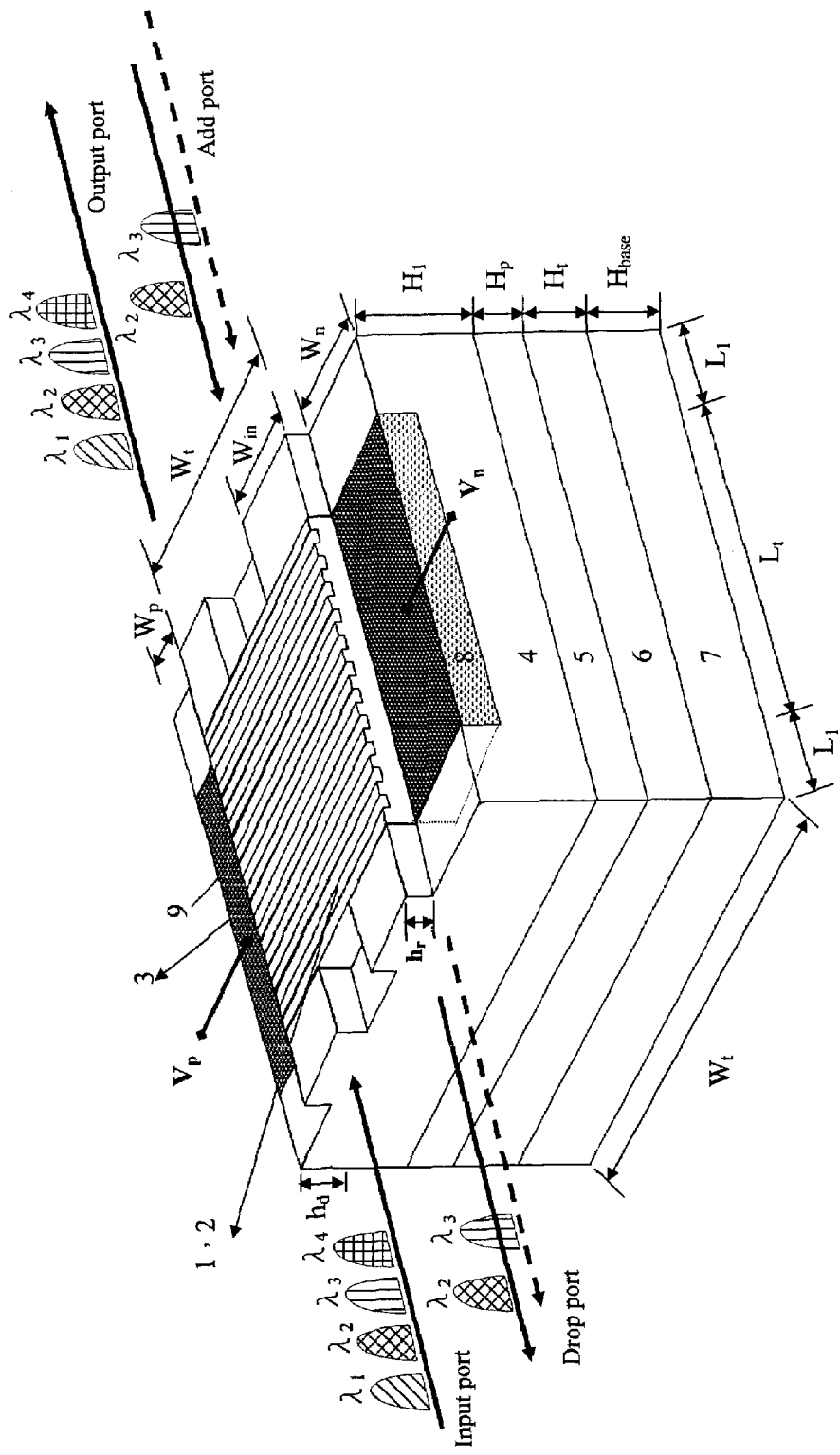
FIG. 7 is a structurally schematic view showing the tunable OADM in a preferred embodiment according to the present invention.

Please refer to FIG. 7 which is a structurally schematic view showing the tunable OADM in a preferred embodiment according to the present invention. As shown in FIG. 7, if there are four wavelength signals entering the tunable OADM (at the input port), any one of them can be dropped out through the grating 1 designed by the present invention, and another signal can also be easily dropped out due to the voltage supplied to the two ends of the electrode 3. Identically, a signal can be added into the tunable OADM at the add port and through utilizing a variation of the voltage, even a different signal also can be added thereinto. Finally, if only one of the four signals inputted at the input port is dropped out from the drop port, the other three signals will straightly pass through the tunable OADM and output at the add port plus the added signal. It should be noted that if the voltage is altered, a different signal will be randomly dropped out or added in.

For testing and verifying the feasibility of this tunable OADM, it particularly employs BreamPROP simulation analysis to prove the integrated tunable OADM according to the present invention. FIG. 4 is namely the analyzed result of time variation vs. refractive index as simulating the variation of refractive index within a fixed time range. As shown in FIG. 4, at time equals to 20 ns, the carriers are completely injected, that is to say, the switching speed of the tunable OADM can be controlled to range in 20 ns. As shown in FIG. 5, which is a curve of voltage and refractive index, when the voltage is getting larger, the refractive index is relatively getting bigger, too. Accordingly, in the tunable OADM, according to the present invention, the voltage can be operated within ±6V. However, the voltage also can be tuned corresponding to a practical situation.

Moreover, FIG. 6 proves that different wavelengths can be dropped out from the drop port when the voltage is supplied thereto or not the OADM so as to cause the Bragg grating 1 and the multimode interference region 2 to generate some differences. Through controlling the supplying voltage to the tunable OADM shown in FIG. 7, it can be known that when four wavelengths are simultaneously inputted into the tunable OADM, if no voltage is supplied thereto, signal 2 will be dropped out at the drop port and other three wavelengths will straightly pass therethrough and output at the output port simultaneously with the wavelength added at the add port. However, when the voltage supplied to the electrode 3 is changed, a different wavelength will be dropped out. Therefore, after the examining above, it is clear that the tunable OADM according to the present invention owns a tunable wavelength add/drop function.

Figure 8:
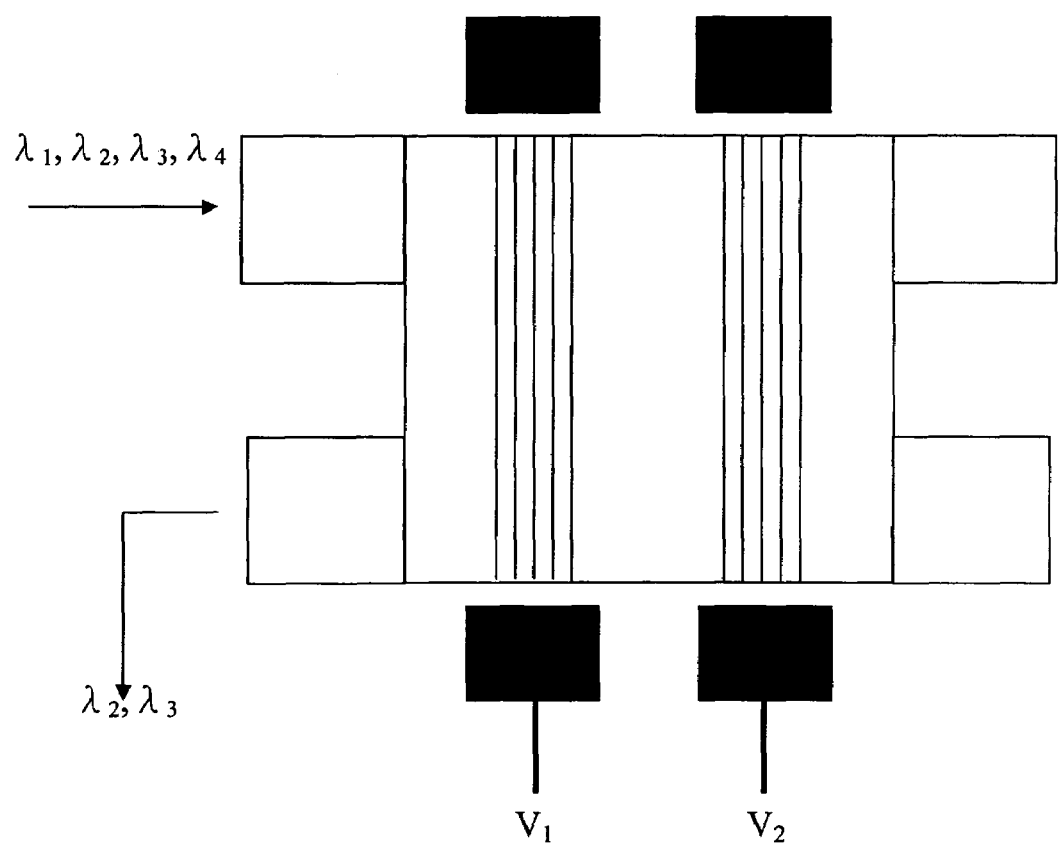
FIG. 8 is a schematic view showing a condition of sectional supplying voltage to the electrode of the tunable OADM in a preferred embodiment according to the present invention.

Thus, it can be known that the present invention can control the drop of a wavelength from the tunable OADM by utilizing different operative instantaneous voltages supplied thereto. When the voltage is controlled to be $V_1$, a wavelength $\lambda_1$ can be dropped out, and when the voltage is controlled to be $V_2$, a wavelength $\lambda_2$ can be dropped out. Analogously, it can be extended that when the operative voltage is $V_N$, a wavelength $\lambda_N$ can be dropped out. Alternatively, the electrode also can be separated into sections which are supplied by different voltages simultaneously, so that different wavelengths can be dropped out at the same time, as shown in FIG. 8.

Please refer to FIGS. 9A~9D which are schematic views showing the steps for forming the tunable OADM in a preferred embodiment according to the present invention. The steps are:

Step 1: depositing the poly-Si propagating layer 4 on the top of the SOI wafer so as to thicken the silicon layer to be a light guiding layer.

Step 2: evenly spin-coating a photoresist on the polysilicon layer and lithographing the photoresist to form the shapes of the multimode interference region 2 and the input and output waveguides.

Step 3: fabricating the multimode interference region 2 and the input and the output waveguide by a reactive ion etch (RIE).

Figure 9A:
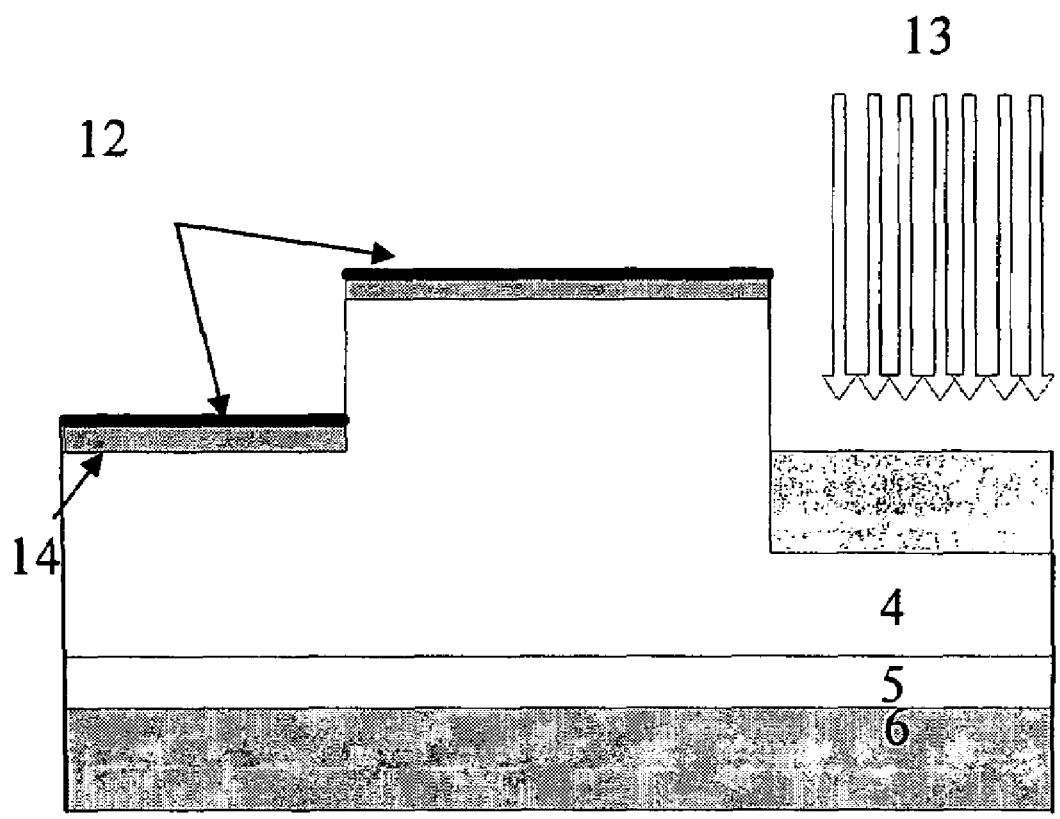
FIGS. 9A~D are schematic views showing the steps for forming the tunable OADM in a preferred embodiment according to the present invention.

Step 4: depositing a layer of resist 12 on the multimode interference region 2 and the left side thereof and injecting pentad ions through an ion implantation method so as to form an n-type region 13, as shown in FIG. 9A.

Figure 9B:
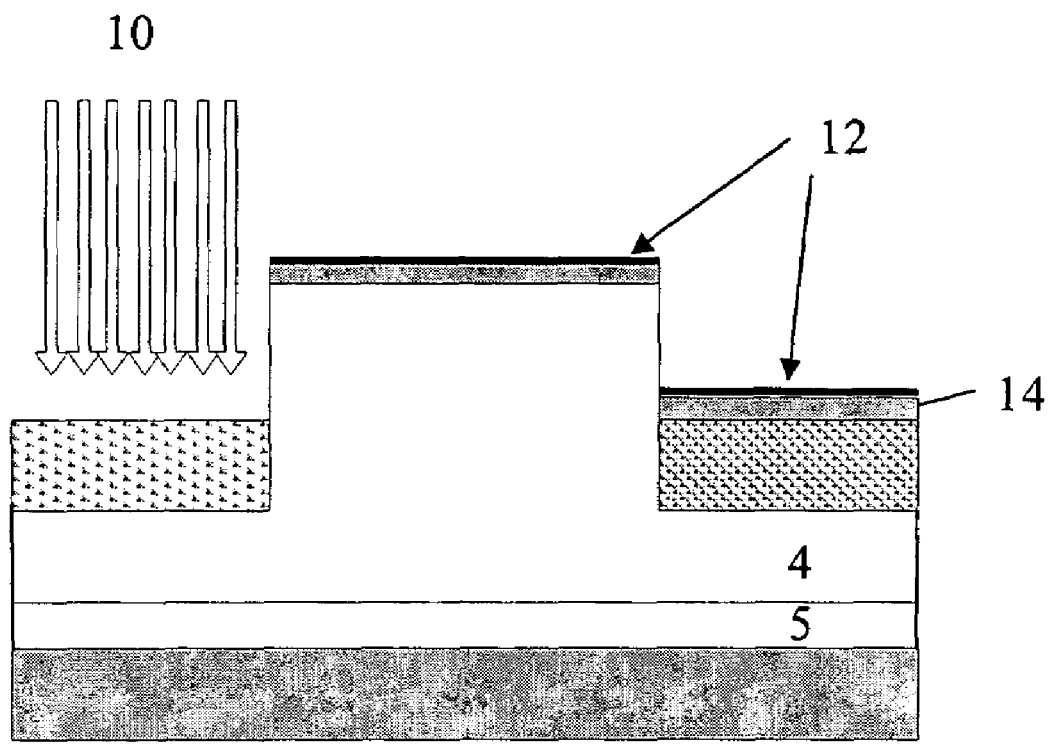

Step 5: forming a mask 14 on the right side of the multimode interference region 2, defining a p-well pattern, and injecting trivalence ions into the top silicon layer by the ion implantation method so as to form a p-type region 10, as shown in FIG. 9B.

Figure 9C:
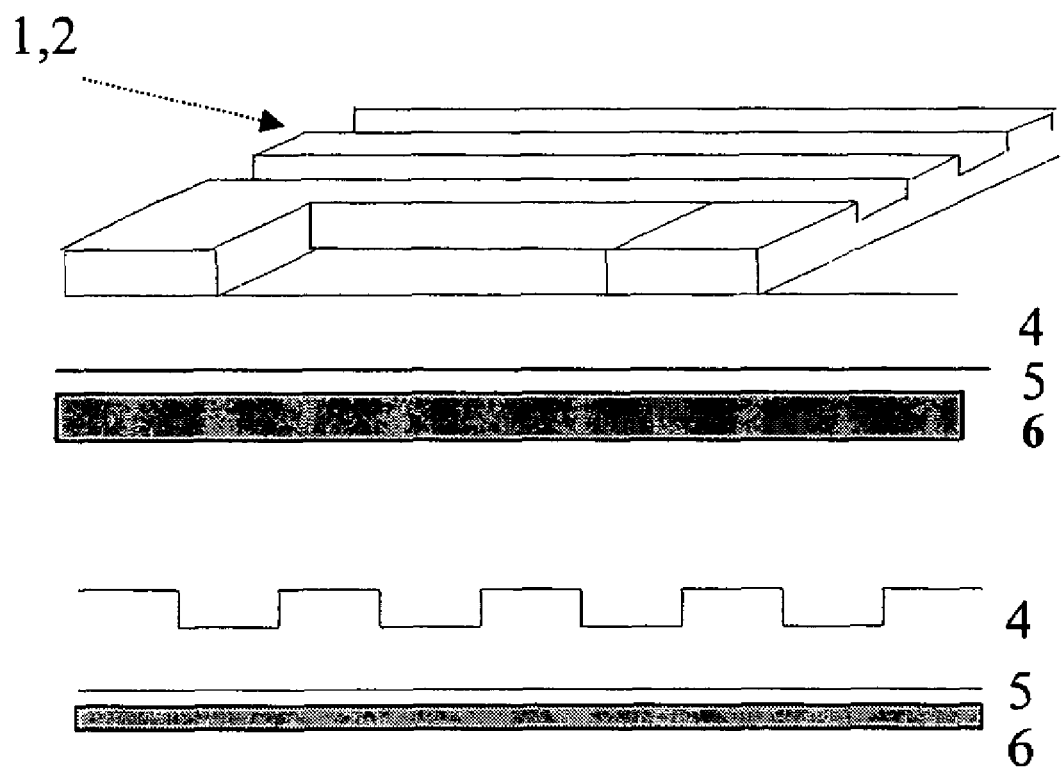

Step 6: fabricating a periodic grating structure 1 on the multimode interference region 2 by utilizing an electron beam etching technique, as shown in FIG. 9C.

Figure 9D:
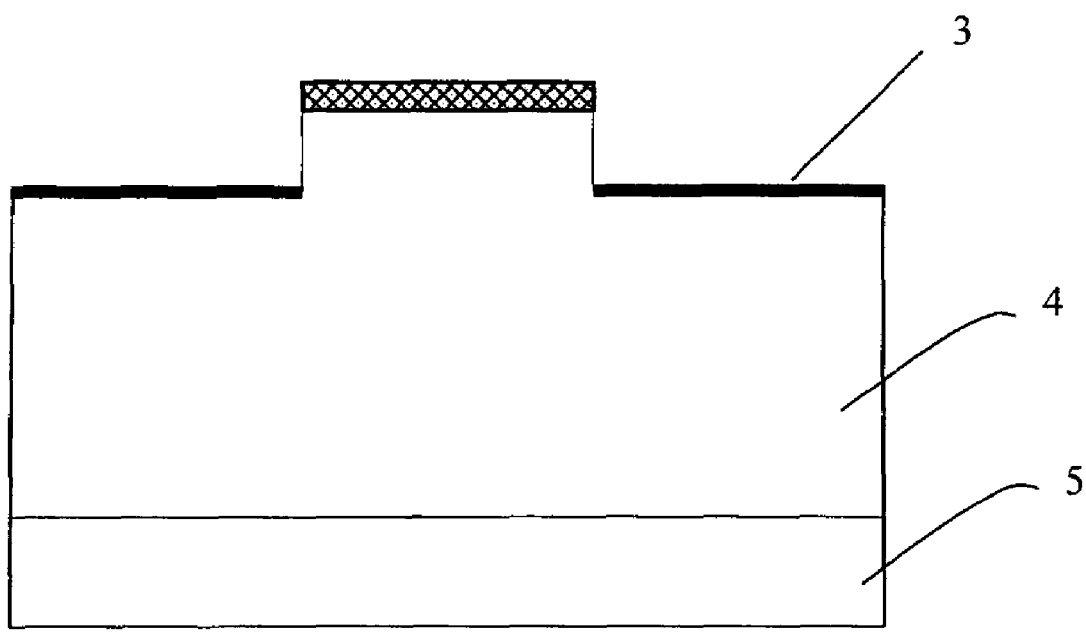

Step 7: plating a thin metal film on the two sides of the multimode interference region 2 so as to form the electrode 3, as shown in FIG. 9D.

Corresponding to the steps described above, one can fabricate the tunable OADM according to the present invention whose sectional view and carrier distribution are shown in FIG. 3.

Figure 10:
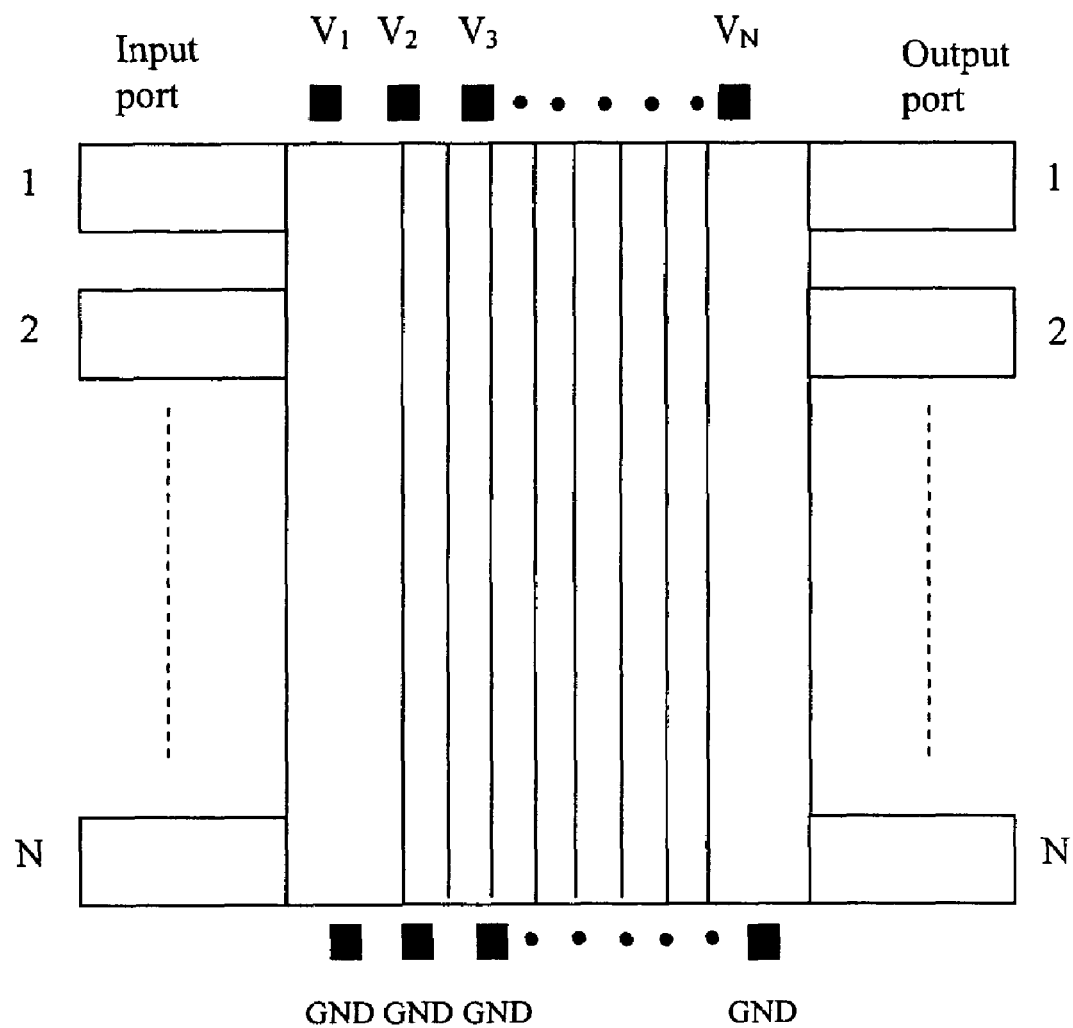
FIG. 10 is a schematic view showing the structure of the tunable OADM with N×N ports according to the present invention.
Figure 11:
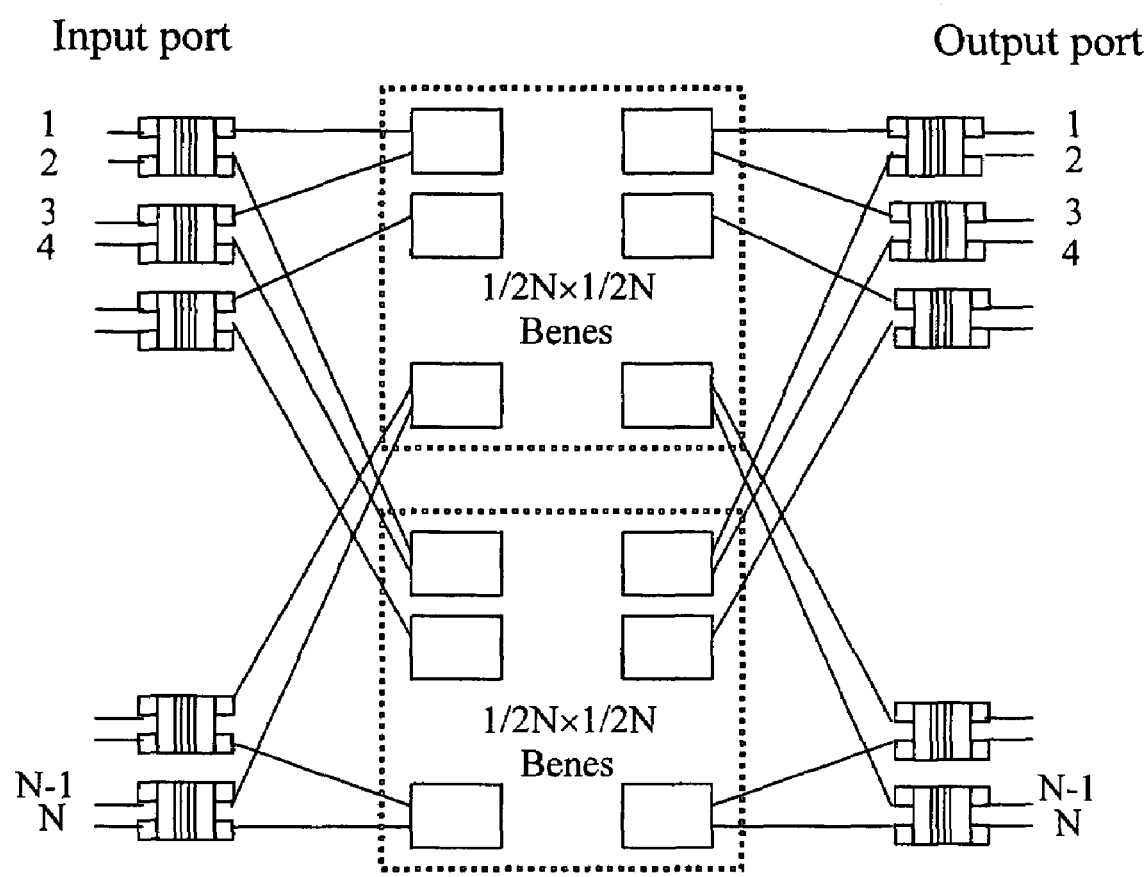
FIG. 11 is a schematic view showing the structure of a N×N Banes optical switch according to the present invention.
Figure 12:
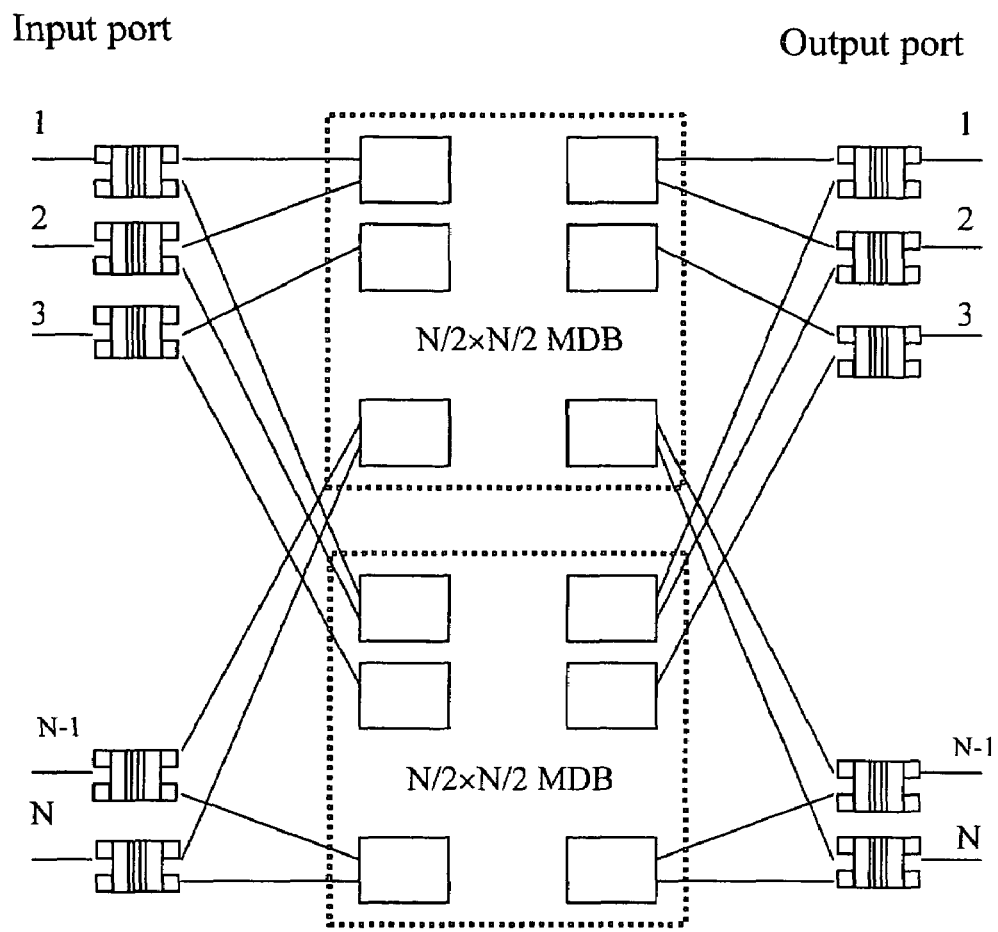
FIG. 12 is a schematic view showing the structure of N×N MDB switch according to the present invention.

According to an aspect of the present invention, the tunable OADM can increase the number of the input and output ports to N, so that a light wavelength exchanging switch with N×N ports can be obtained through a cascade connection thereamong by using a module arrangement. And, the light wavelength exchanging switch may have a multi-sectional electrode so as to simultaneously drop out different wavelength signals by supplying different voltages ($V_1$, $V_2$, $V_3$, . . . , $V_N$) thereto, as shown in FIG. 10. Moreover, the tunable OADM according to the present invention also can be combined in a way that plural 2×2 integrated SOI-based tunable OADM are combined together to form an N×N Benes optical switch, as shown in FIG. 11. Furthermore, the tunable OADM according to the present invention further can be combined in another way that 2×2 integrated SOI-based tunable OADMs are combined in a multilayered sub-matrix arrangement so as to make an N×N MDB (Modified Dilated Benes) switch, as shown in FIG. 12.

In view of the aforesaid, the tunable OADM according to the present invention focuses on bringing up an effective and automatic router switching method, designing a wavelength selectable component and researching a protection network for the intelligent wavelength division multiplexing optical network so as to improve the reliability of the intelligent wavelength division multiplexing optical network. The wavelength selectable component is an integrated tunable OADM which is comprised of the Bragg grating and the multimode interference region, wherein the two sides of the Bragg grating are respectively doped by boron and phosphorous ions, the concentrations of the dopants in the Bragg grating are altered by tuning the supplied voltage, and then the refractive index thereof will be changed by the alternation of dopants, thereby a specific signal can be dropped from the waveguide so as to achieve a specific wavelength controllable router path. The tunable OADM according to the present invention can be applied in a DWDM (Dense Wavelength Division Multiplexing) protection network system for sufficiently utilizing the limited wavelength resource. Furthermore, because the advantages of economizing the volume of the silicon wafer so as to save the cost, being compatible with the current semiconductor procedures and having the wideband efficiency which can effectively improve the conventional defects, the present invention is industrial valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tunable optical add-drop multiplexer (OADM) based on an SOI (silicon-on-insulator) wafer, comprising:
   a multimode interference region;
   at least a grating formed on said multimode interference region; and
   at least two electrodes formed on two sides of said multimode interference region and having carriers induced thereinto,
   wherein said grating is structurally changed through one of arranging identical grating periods and arranging different grating periods, so as to control a wavelength response,
   thereby a variation of an optical waveguide in said grating is controlled through controlling said carriers induced into said electrodes so as to further control different propagation of wavelength signals.

2. The optical add-drop multiplexer according to claim 1 further comprising at least an input port formed on one of said two sides of said multimode interference region for receiving multiple wavelength signals.

3. The optical add-drop multiplexer according to claim 1 further comprising at least a drop port formed on one of said two sides of said multimode interference region for gathering a portion of said wavelength signals.

4. The optical add-drop multiplexer according to claim 3 further comprising at least an add port formed on the other said side of said multimode interference region for adding at least a signal having a random wavelength.

5. The optical add-drop multiplexer according to claim 4 further comprising at least an output port formed on the other said side of said multimode interference region for outputting a non-gathered portion of said wavelength signals and said signal having a random wavelength.

6. The optical add-drop multiplexer according to claim 1 wherein said grating is a Bragg grating.

7. The optical add-drop multiplexer according to claim 1 wherein said grating varies a refractive index thereof so that an wavelength signal passing therethrough has a tunable wavelength due to an involved said index.

8. The optical add-drop multiplexer according to claim 1 wherein said grating is changed in wavelength response through altering a height thereof so as to add or drop different said wavelength signals.

9. The optical add-drop multiplexer according to claim 1 wherein said multimode interference region has a variable cross section so that a variation of a corresponding gathered wavelength is presented after said carriers are controlled by different voltages.

10. The optical add-drop multiplexer according to claim 1 wherein said multimode interference region has a tunable length and a tunable width for adjusting a wavelength response of the interference so as to adjust a position of an initial central wavelength.

11. The optical add-drop multiplexer according to claim 1 wherein said electrodes are changed in structure and/or in dimension so that a current of said carriers has a different injecting efficiency into said electrodes so as to control a speed of adding and dropping a wavelength.

12. The optical add-drop multiplexer according to claim 1 wherein said electrodes are electroplated by different materials so that a current of said carriers has a different injecting efficiency into said electrodes, and thereby a power variation of a corresponding gathered wavelength is controlled by a variation of a refractive index of said grating so as to design different central wavelength responses.

13. The optical add-drop multiplexer according to claim 1 wherein an instantaneous variation of an index of said grating is achieved through instantaneously inputting different voltages for controlling a power variation of a corresponding gathered wavelength so as to achieve an instantaneous exchange of wavelengths.

14. The optical add-drop multiplexer according to claim 1 wherein a gathering of said wavelength signals is controlled through operating different instantaneous voltages.

15. The optical add-drop multiplexer according to claim 1 wherein said electrodes are sectionalized and supplied by different voltages for simultaneously gathering different wavelength signals.

16. The optical add-drop multiplexer according to claim 1 wherein when a number of both said output and input ports are N, an optical wavelength exchanging switch with N×N ports is obtained through a serial connection thereamong by using a module arrangement, and, through being supplied different voltages and having multi-sectional electrodes, said optical wavelength exchanging switch simultaneously gathers different wavelength signals.

17. The optical add-drop multiplexer according to claim 1 wherein plural 2×2 said wavelength tunable optical add-drop multiplexers based on said SOI wafer are combined to make an N×N Benes optical switch.

18. The optical add-drop multiplexer according to claim 1 wherein 2×2 said wavelength tunable optical add-drop multiplexers based on said SOI wafer are combined in a multilayered sub-matrix arrangement so as to make an N×N MDB switch.

19. A method for manufacturing a wavelength tunable optical add-drop multiplexer based on a semiconductor wafer, comprising steps of:
   (a) providing a substrate;
   (b) forming an insulating layer and a conducting layer on said substrate;
   (c) defining a multimode interference region and plural input/output waveguides on said conducting layer;
   (d) forming an N type region and a P type region respectively on two sides of said multimode interference region;
   (e) defining a periodic grating structure on said multimode interference region; and
   (f) forming two electrodes respectively on said N type region and said P type region.

20. The method according to claim 19 wherein said semiconductor wafer is an SOI (silicon-on-insulator) wafer.

21. The method according to claim 19 wherein said substrate is a silicon substrate.

22. The method according to claim 19 wherein said insulating layer is a silicon dioxide layer.

23. The method according to claim 19 wherein said conducting layer is a polysilicon propagating layer.

24. The method according to claim 19 further comprising a step of doping a doping layer between said insulating layer and said conducting layer.

25. The method according to claim 19 wherein said step (c) is performed by a reactive ion etching.

26. The method according to claim 19 wherein said N type region is formed by doping a pentad element into said conducting layer through an ion implantation.

27. The method according to claim 26 wherein a refractive index of said grating is variable through a different concentration distribution of the ions doped by said ion implantation so as to control a variation of a corresponding gathered central wavelength of said wavelength tunable optical add-drop multiplexer for achieving a design of different central wavelengths.

28. The method according to claim 27 wherein said ions are controlled by a current supplied thereto for obtaining different refractive indices of said grating so as to control a power variation of a corresponding gathered wavelength of said wavelength tunable optical add-drop multiplexer for achieving a wavelength exchange.

29. The method according to claim 19 wherein said P type region is formed by doping a trivalent element into said conducting layer through an ion implantation.

30. The method according to claim 29 wherein a refractive index of said grating is variable through a different concentration distribution of the ions doped by said ion implantation so as to control a variation of a corresponding gathered central wavelength of said wavelength tunable optical add-drop multiplexer for achieving a design of different central wavelengths.

31. The method according to claim 30 wherein said ions are controlled by a current supplied thereto for obtaining different refractive indices of said grating so as to control a power variation of a corresponding gathered wavelength of said wavelength tunable optical add-drop multiplexer for achieving a wavelength exchange.

32. The method according to claim 19 wherein said step (e) is performed by an electron beam etching.

33. The method according to claim 19 wherein said electrodes are formed through electroplating a metal thin film on said N type and said P type regions.

* * * * *